United States Patent Office 3,351,603
Patented Nov. 7, 1967

3,351,603
ACRYLATE COLORLESS TRANSPARENT PHOTO-ACTIVATABLE CEMENTING COMPOSITIONS
Catherine Shuihua Hsia Chen, Berkeley Heights, N.J., and Florence Martha Gray, Stamford, Conn., assignors to American Cyanamid Company, Stamford, Conn., a corporation of Maine
No Drawing. Filed Feb. 19, 1965, Ser. No. 434,108
9 Claims. (Cl. 260—31.2)

ABSTRACT OF THE DISCLOSURE

The novel composition herein disclosed relates to a photoactivatable cementing composition for colorless transparent organic sheet material and consists essentially of a monomeric methyl methacrylate having a content of a oil soluble dye as a latent photopolymerization catalyst, an oil reducing agent for said dye and a poly(methyl methacrylate). Some of the dyes which are useful are ethyl eosin Y, methyl eosin Y, erythrosin, phloxin and rose bengale. Some of the reducing agents which are suitable are tetramethylethylenediamine, 2, 5-dichlorophenylhydrazine, phenylhydrazine, hydroxylamine, and allylthiourea.

---

The present invention relates to quick-setting photoactivatable compositions which are useful as cements for colorless transparent synthetic organic hydrophobic sheet material.

The quick cementing of colorless transparent synthetic organic sheet material has presented a difficult problem to the construction art. A number of quick-setting cements are known, but such cements are either colored and so are plainly visible in the product, or they etch or otherwise mar the surface which is cemented so that the joint is plainly visible by reasons of decreased transparency. Water-clear and colorless cements are also known, but these take so long to set that they are not practically useful. Moreover, the joints provided by such cements tend to be weak.

The present invention is adapted to the cementing of such colorless and transparent hydrophobic synthetic organic sheet material as polyvinyl chloride and "Lexan" (formed by condensing a bisphenol with phosgene). The invention is particularly important in connection with the cementing of poly(methyl methacrylate) because poly(methyl methacrylate) is in large scale use as a material for outdoor construction and the present invention provides joints which are invisible, colorless, strong, and weather-resistant, and which develop virtually their maximum strength quickly when exposed to the sun of an average day, even when the sheet material contains an absorber for ultra-violet light as is usually the case.

The cementing compositions of the present invention consist essentially of monomeric methyl methacrylate having a content of (a) an oil-soluble dye of the theoretical formula

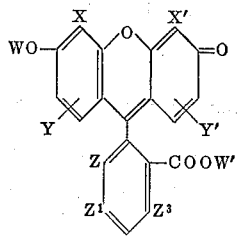

wherein W and W' designate a substituent from the group consisting of hydrogen, the alkali metals, and hydrocarbon radicals having not more than 6 carbon atoms; X and X' designate a halogen having an atomic number above that of fluorine, Y and Y' designate hydrogen and a halogen having an atomic number above that of fluorine, and Z, $Z^1$, $Z^2$ and $Z^3$ designate hydrogen, halogens having an atomic number above that of fluorine, and hydrocarbon radicals having no more than 6 carbon atoms, at latent photopolymerization catalyst for said methyl methacrylate; (b) an oil-soluble reducing agent for said dye, said agent having a reduction potential which is sufficiently low to be incapable of reducing said dye in the absence of light but which is sufficiently high to reduce said dye in the presence of light; and (c) poly(methyl methacrylate) in amount between 25% and 67% of the weight of said methyl methacrylate as hardening accelerator therefor.

Preferred compositions of the present invention have the following particularly advantageous properties:

(1) They set to substantially maximum strength in less than one hour under average sunlight.

(2) The joints which are formed are strong and weather-resistant. They neither yellow nor develop any other color on aging.

(3) The compositions do not require ultra-violet light to set. The compositions may thus be used for cementing synthetic transparent plastic sheet material which contains an ultra-violet light absorber.

The dyes referred to above are critical in the composition of the present invention. They include ethyl eosine Y, methyl eosine Y (a composition according to the formula shown above where W is methyl, X and X' are bromo, Y and Y' are hydrogen and the Z's are hydrogen), erythrosin, phloxin, and rose bengale. Photo-activatable reducing agents include tetramethylene diamine, phenylhydrazine, (2,5-dichlorophenylhydrazine), hydroxylamine, and allylthiourea.

The oil-soluble dye is present in at least sufficient amount so that when activated by the reducing agent it causes the methyl methacrylate to set within a desirably short time. If preferred, the amount of dye present may be at the practical maximum. This is the amount of dye which is sufficient to cause substantially the maximum rate of cure, while becoming colorless when its photopolymerization action is completed.

The amount of reducing agent present should be sufficient to reduce the dye when the cementing composition to light. A larger amount of the reducing agent may be employed, but such larger amount confers no significant advantage.

When too little of the reducing agent is present, the cementing composition generally possesses some color when in ultimate set state.

Additional dyes and reducing agents suitable for use in compositions of the present invention are disclosed in Oster U.S. Patent No. 2,875,047.

The amounts of dye and reducing agents which should be present in cementing compositions of the present invention vary from instance to instance depending chiefly on the comparative effectiveness as catalysts of the particular dyes used and on the comparative effectiveness of the reducing agents as exciters for the dyes.

In each instance, appropriate amounts of the dye and of the reducing agent can be determined by a series of laboratory trials, as shown by the examples below. As a starting point for the series, the weights of the dye and reducing agent may be respectively 0.05% and 0.1% of the weight of the monomeric methyl methacrylate.

In the laboratory, suitable amounts of the two agents may be arrived at by making a series of trials wherein 0.02% to 0.05% of one of the above-described dyes are dissolved into methyl methacrylate, samples are taken from the mixture, and increasing amounts of reducing agent are added to the respective samples starting at 0.1% based on the weight of the methyl methacrylate, so as to determine the amount of reducing agent which yields a joint of minimum color intensity when the composition has set to hard state under the action of light. The amount of the dye in the composition of minimum color is then decreased in additional trials until a composition is obtained which yields a colorless transparent hard polymeric mass when caused to set by the action of light.

The third component of the composition is polymerized methyl methacrylate, and the weight of this component is critical. It should be at least 25% of the weight of the methyl methacrylate monomer. When less than this amount is present, the composition as a whole is slow-setting that it is of comparatively little commercial value. On the other hand, the amount of the poly(methyl methacrylate) should not exceed 67% of the weight of the methyl methacrylate monomer because when larger amounts are present the cement is not readily applicable to the surfaces to be joined.

If desired, small amounts of other components may be present in the cement compositions of the present invention which do not significantly alter the character of the composition as a cement. Thus the compositions may contain minor amounts of vinyl monomers which can be copolymerized with methyl methacrylate, for example, vinyl acetate, styrene, acrylonitrile, and vinylpyridine. Moreover, a minor proportion of the poly(methyl methacrylate) may be replaced with small amounts of polyvinyl acetate, polystyrene, poly(vinylpyridine), and poly(vinylpyrrolidone), or with other normally hard polymers which are soluble in methyl methacrylate at room temperature.

The invention is further illustrated by the examples, which are specific embodiments of the invention and which are not to be construed as limitations thereon.

*Example 1*

The following illustrates a number of quick-setting photoactivatable cementing compositions according to the present invention.

Two solutions are prepared, each composed of 7.0 g. of monomeric methyl methacrylate having 3.0 g. of poly(methyl methacrylate) dissolved therein. To one is added 0.0015 g. of ethyl eosin Y

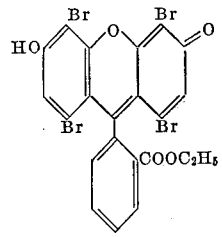

To the other is added 0.01 g. of tetramethyleneethylenediamine. The two solutions are mixed in dim light and the resulting solution is placed in a tin squeeze tube of the type commonly used to hold toothpaste. The viscosity of the cement in the tube remains substantially constant at room temperature for more than a month.

The procedure is repeated except that the ethyl eosin Y is omitted and the following dyes are used in place thereof.

| Sample | Dye | | | Colour of Composition |
|---|---|---|---|---|
| | Name | Colour Index | Wt., g. | |
| B | Methyl eosin Y | None | 0.0018 | |
| C | Erythrosin | 772 | 0.0018 | |
| D | Phloxin | 778 | 0.002 | Reddish fluorescence. |
| E | Rose bengal | 777 | 0.002 | |
| F | Ethyl eosin | 770 | 0.0018 | |

Each of the resulting cementing compositions is spread over an area 1" wide along an edge of a clear transparent and colorless poly(methyl methacrylate) panel 6" x 6" x 1/8". A lap joint is formed by pressing a 1" wide edge of a similar poly(methyl methacrylate) panel thereover. The resulting 6" x 11" assemblies are exposed out-of-doors (air temperature 80° F.) under a sheet of glass which is opaque to ultra-violet light to the light from a noonday sun having an altitude of 45° above the horizon. The joints become firm in about 30 minutes. At the end of about 60 minutes, severe flexing breaks the panels but the joints hold firm.

The joints are clear, colorless, and clearly transparent. The eye does not perceive the presence of cementing material.

The joints are soaked in water 7 days, frozen to 20° F., thawed, and subjected to 10 days in a Weather-o-meter to simulate weathering. The treatment does not affect the strength or appearance of the joints.

Polyvinyl chloride panels are joined by use of the cement described above. The cement being set by exposure to fluorescent light. A strong transparent joint is obtained.

Panels of "Lexan" (a clear transparent polycarbonate plastic formed by condensing a bisphenol with phosgene) are cemented in the same manner with the same results.

*Example 2*

The following illustrates the criticality of the amount of poly(methyl methacrylate) present in the cementing composition.

The procedure of run A of Example 1 is repeated, except that the amount of poly(methyl methacrylate) is varied to provide the amounts shown in the table below, and the cementing composition is activated by exposure without special heating on a laboratory bench to the light from a 150-watt white incandescent electric light bulb held 7" from the joint in a polished metal reflector for 60 minutes. Results are as follows:

| Run | Percent Poly-(methyl methacrylate)[1] | Cement After Setting | | Strength, percent joint |
|---|---|---|---|---|
| | | Color | Hardness | |
| A | 0 | Red | Does not set | None. |
| B | 10 | Pink | Soft | Poor |
| C | 25 | None[2] | Hard | Good. |
| D | 54 | do | Very hard | Cohesive break.[3] |
| E | 67 | do | do | Do. |
| F | 100 | (Cement too thick to spread.) | | |
| G | 150 | | | |

[1] Based on weight of methyl methacrylate monomer.
[2] Color does not return when cemented sheet is kept one month.
[3] When assembly is flexed, the panel breaks and the joints hold firm.

We claim:
1. A quick-setting photoactivatable cementing composition for colorless transparent and hydrophobic organic sheet material, consisting essentially of monomeric methyl methacrylate having a content of

(a) an oil-soluble dye of the theoretical formula

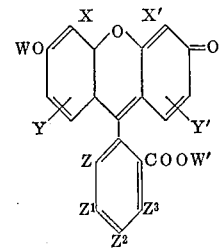

wherein W and W′ designate a substituent from the group consisting of hydrogen, the alkali metals and hydrocarbon radicals having not more than 6 carbon atoms; X and X′ designate halogens having atomic numbers above that of fluorine; Y and Y′ designate hydrogen and halogens having atomic numbers above that of fluorine; and Z, $Z^1$, $Z^2$ and $Z^3$ designate hydrogen, a halogen having an atomic number above that of fluorine, and a hydrocarbon having no more than 6 carbon atoms, at latent photopolymerization catalyst for said methyl methacrylate;

(b) an oil-soluble reducing agent for said dye, said agent having a reduction potential which is sufficiently low to be incapable of reducing said dye in the absence of light but which is sufficiently high to reduce said dye in the presence of light selected from the group consisting of tetramethylethylenediamine, phenylhydrazine (2,5-dichlorophenylhydrazine), hydroxylamine, and allylthiourea; and (c) poly(methyl methacrylate) in amount 25% to 67% of the weight of said methyl methacrylate as hardening accelerator therefor.

2. A composition according to claim 1 wherein the photopolymerization catalyst is ethyl eosin Y.

3. A composition according to claim 1 wherein the photopolymerization catalyst is methyl eosin Y.

4. A composition according to claim 1 wherein the photopolymerization catalyst is erythrosin.

5. A composition according to claim 1 wherein the photopolymerization catalyst is phloxin.

6. A composition according to claim 1 wherein the photopolymerization catalyst is rose bengale.

7. A composition according to claim 1 wherein the reducing agent is tetramethylethylenediamine.

8. A composition of matter according to claim 1 wherein the reducing agent is 2,5-dichlorophenylhydrazine.

9. A composition of matter according to claim 1 wherein the weight of the poly(methyl methacrylate) is 50% of the weight of said monomeric methyl methacrylate.

References Cited

UNITED STATES PATENTS

| | | | |
|---|---|---|---|
| 2,413,973 | 1/1947 | Howk | 204—159.16 |
| 2,744,886 | 5/1956 | Protzman | 260—31.2 |
| 2,948,706 | 8/1960 | Schellenberg | 204—159.16 |
| 2,947,716 | 8/1960 | Cornell | 204—159.16 |
| 2,986,507 | 5/1961 | Steck | 204—159.16 |

JULIUS FROME, *Primary Examiner.*

UNITED STATES PATENT OFFICE
CERTIFICATE OF CORRECTION

Patent No. 3,351,603                     November 7, 1967

Catherine Shuihua Hsia Chen et al.

It is hereby certified that error appears in the above numbered patent requiring correction and that the said Letters Patent should read as corrected below.

Column 2, lines 45 and 46, after "composition" insert -- is exposed --; column 5, line 1, for "at" read -- as --.

Signed and sealed this 8th day of April 1969.

(SEAL)
Attest:

Edward M. Fletcher, Jr.              EDWARD J. BRENNER

Attesting Officer                  Commissioner of Patents